(12) United States Patent
Jones

(10) Patent No.: US 9,109,801 B2
(45) Date of Patent: Aug. 18, 2015

(54) COAL HEAT-TREATMENT PROCESS AND SYSTEM

(75) Inventor: Michael A. Jones, Queen Creek, AZ (US)

(73) Assignee: Pneumatic Processing Technologies, LLC, New Orleans, LA (US)

( * ) Notice: Subject to any disclaimer, the term of this patent is extended or adjusted under 35 U.S.C. 154(b) by 600 days.

(21) Appl. No.: 12/626,458

(22) Filed: Nov. 25, 2009

(65) Prior Publication Data

US 2011/0003686 A1  Jan. 6, 2011

Related U.S. Application Data

(63) Continuation-in-part of application No. 12/497,475, filed on Jul. 2, 2009, now Pat. No. 8,309,052.

(51) Int. Cl.
| | |
|---|---|
| F23K 1/00 | (2006.01) |
| C01B 31/08 | (2006.01) |
| C01B 31/12 | (2006.01) |
| F23K 1/04 | (2006.01) |

(52) U.S. Cl.
CPC .................. *F23K 1/00* (2013.01); *C01B 31/082* (2013.01); *C01B 31/086* (2013.01); *C01B 31/12* (2013.01); *F23K 1/04* (2013.01); *F23K 2201/505* (2013.01); *F23K 2203/201* (2013.01)

(58) Field of Classification Search
None
See application file for complete search history.

(56) References Cited

U.S. PATENT DOCUMENTS

| | | | |
|---|---|---|---|
| 3,377,146 A * | 4/1968 | Von Stroh | ........................ 75/321 |
| 3,584,848 A | 6/1971 | Kyyonaga et al. | |
| 3,647,716 A | 3/1972 | Koches | |
| 3,758,037 A | 9/1973 | Marion et al. | |
| 3,834,860 A | 9/1974 | Fukuda et al. | |
| 3,862,294 A | 1/1975 | Engelhart et al. | |
| 3,881,862 A | 5/1975 | Nishida et al. | |
| 3,886,093 A | 5/1975 | Dimitri | |
| 3,891,382 A | 6/1975 | Lawall et al. | |
| 3,958,957 A | 5/1976 | Koh et al. | |
| 3,961,903 A | 6/1976 | Nielsen et al. | |
| 3,980,486 A | 9/1976 | Touborg | |
| 4,025,295 A | 5/1977 | Touborg | |
| 4,032,476 A * | 6/1977 | Murty | ............................ 502/425 |
| 4,107,084 A | 8/1978 | Repik et al. | |
| 4,118,177 A | 10/1978 | Weber et al. | |
| 4,128,392 A | 12/1978 | Tock | |

(Continued)

FOREIGN PATENT DOCUMENTS

| | | |
|---|---|---|
| EP | 0433677 A1 | 6/1991 |
| JP | 2004168836 | 6/2004 |

OTHER PUBLICATIONS

Supplementary Partial European Search Report dated Mar. 23, 2011.

(Continued)

*Primary Examiner* — Guinever S Gregorio
(74) *Attorney, Agent, or Firm* — Quarles & Brady LLP; Gavin J. Milczarek-Desai

(57) ABSTRACT

Methods and systems for producing activated carbon from a particulate coal feedstock that include the introduction of an activation medium such that the water content of the coal feedstock is equal to or greater than that of the feedstock's naturally occurring state. Different methods and system configurations allow the production of activated carbon or other heat-treated carbons while concurrently avoiding adverse reaction conditions.

29 Claims, 7 Drawing Sheets

(56) References Cited

U.S. PATENT DOCUMENTS

| | | | |
|---|---|---|---|
| 4,159,306 A | 6/1979 | Borst | |
| 4,198,273 A | 4/1980 | Dudek et al. | |
| 4,201,541 A | 5/1980 | Schoppe | |
| 4,242,226 A | 12/1980 | Siren | |
| 4,260,369 A | 4/1981 | Warshawsky | |
| 4,268,417 A * | 5/1981 | Messer | 502/430 |
| 4,273,619 A | 6/1981 | Angelo, II | |
| 4,299,560 A | 11/1981 | Nakamura et al. | |
| 4,318,745 A | 3/1982 | Kraus | |
| 4,324,544 A | 4/1982 | Blake | |
| 4,366,000 A | 12/1982 | Wadia | |
| 4,483,831 A | 11/1984 | Schmidt et al. | |
| 4,511,543 A | 4/1985 | Keren et al. | |
| 4,529,579 A | 7/1985 | Raahauge | |
| 4,551,155 A | 11/1985 | Wood et al. | |
| 4,568,276 A | 2/1986 | Fujisawa | |
| 4,632,731 A * | 12/1986 | Bodle et al. | 201/4 |
| 4,668,182 A | 5/1987 | Cohen | |
| 4,724,780 A | 2/1988 | Hoffert et al. | |
| 4,743,271 A | 5/1988 | Kindig et al. | |
| 4,747,773 A | 5/1988 | Predescu et al. | |
| 4,861,265 A | 8/1989 | Durr et al. | |
| 4,932,862 A | 6/1990 | Kettenbauer | |
| 5,132,102 A | 7/1992 | Cohen et al. | |
| 5,174,749 A | 12/1992 | Jorgensen et al. | |
| 5,260,041 A | 11/1993 | Cohen et al. | |
| 5,266,024 A | 11/1993 | Anderson | |
| 5,282,883 A | 2/1994 | Chaudhuri et al. | |
| 5,302,363 A | 4/1994 | Highfill et al. | |
| 5,713,734 A | 2/1998 | Makris et al. | |
| 5,975,892 A | 11/1999 | Jones | |
| 6,168,424 B1 | 1/2001 | Raynaud et al. | |
| 6,395,145 B1 | 5/2002 | Altman | |
| 6,451,094 B1 | 9/2002 | Chang et al. | |
| 6,485,295 B1 | 11/2002 | Pospisil et al. | |
| 6,558,454 B1 | 5/2003 | Chang et al. | |
| 6,818,043 B1 * | 11/2004 | Chang et al. | 95/37 |
| 6,878,358 B2 | 4/2005 | Vosteen et al. | |
| 6,953,494 B2 | 10/2005 | Nelson, Jr. | |
| 7,052,274 B2 | 5/2006 | Jensen | |
| 7,264,781 B2 * | 9/2007 | Jones | 422/129 |
| RE40,208 E | 4/2008 | Jones | |
| 7,704,921 B2 | 4/2010 | Bool, III et al. | |
| 7,767,007 B2 | 8/2010 | Chao et al. | |
| 2005/0039598 A1 | 2/2005 | Srinivasachar et al. | |
| 2008/0107579 A1 | 5/2008 | Downs et al. | |
| 2008/0193763 A1 | 8/2008 | Hunt et al. | |
| 2008/0201980 A1 * | 8/2008 | Bullinger et al. | 34/493 |
| 2008/0254972 A1 * | 10/2008 | Istvan et al. | 502/182 |

OTHER PUBLICATIONS

Shadle, Lawrence J., et al., "Coal Gasification in a Transport Reactor", Ind. Eng. Chem. Res., 2001, 40 (13), 2782-2792, DOI: 10.1021/ie001113u, Publication Date (Web): May 25, 2011.

Suuberg, E.M., et al., Study of Activation of Coal Char, Annual Technical Progress Report, Jul. 2002-Jun. 2003.

Srinivasakannan, C., High Surface Area Activated Carbon from Waste Biomass, Proceedings of the 2nd Regional Conference on Energy Technology Towards a Clean Environment, Feb. 12-14, 2003, Phuket, Thailand.

Crada Facts, Department of Energy, Office of Fossil Energy, Transport Reactor Facility.

Granite, Evan J., et al., The Thief Process for Mercury Removal from Flue Gas, United States Department of Energy, National Energy Technology Laboratory.

Chang, Ramsay, et al., Pilot Scale Evaluation of Carbon Compound Additives for the Removal of Trace Metals at Coal-Fired Utility Power Plants.

International Search Report and Written Opinion, mailed Sep. 21, 2010, PCT/US10/40414.

Satya et al. "Production of Activated Carbon from Coconut Shell Char in a Fluidized Bed 1-30 Reactor," Ind. Eng. Chern. Res., 1997, 36 (9), pp. 3625-3630, Sep. 2, 1997, [Retrieved on Aug. 2, 2010] Retrieved from the Internet: <URL:http://pubs.acs.org/doi/abs/1 0.1 021/ie970190v>.

* cited by examiner

COAL HEAT-TREATMENT PROCESS AND SYSTEM

CROSS-REFERENCE TO RELATED APPLICATION

This application is a continuation-in-part of U.S. patent application Ser. No. 12/497,475, filed on Jul. 2, 2009 now U.S. Pat. No. 8,309,052, by the same inventor.

BACKGROUND OF THE INVENTION

1. Field of the Invention

The invention relates to the thermal production of activated carbon and other heat-treated carbons.

2. Description of the Related Art

Recent environmental awareness has focused on the need to remove harmful mercury emissions from coal fired power plants. These efforts have led to several developments with regards to effective mercury removal techniques. The most successful method for mercury removal utilizes pulverized activated carbon injected into the flue gas stream of a coal fired power plant. Extensive research in this field has demonstrated that not all activated carbons effectively remove mercury. There are many factors that influence mercury removal effectiveness using activated carbon in coal fired power plants such as coal fuel type, mercury concentrations, etc. One of the largest factors in the ability of activated carbon to adsorb mercury is the activated carbon pore structure. Not all activated carbons have a suitable pore structure and other characteristics required in order to be effective. Often activated carbons are treated with various agents or gases to improve mercury oxidation and removal. Regardless of whether or not the activated carbon is treated with an enhancing agent, invariably the activated carbons used for this application are selected because of specific physical characteristics considered essential for effective for mercury removal. Based on this relatively successful approach to reducing mercury emissions, so-called activated carbon (treated and untreated) is thought to provide very efficient reduction.

Activated carbon is a term used to describe a carbon material that has been modified to possess a very high surface area that is useful for adsorption, deodorization, and other applications. Thus, activated carbon (AC) refers to carbon that has had its pore structure opened or created. Activated carbon can be produced in two ways. The first is thermal activation where carbon containing material, such as coal, becomes activated by heating it with steam and/or other activating agents such as $CO_2$. The second activation process uses various chemicals to create the open pore structure. These treatments remove residual non-carbon elements and produce a porous internal microstructure having an extremely high surface area. A single gram of such material can have 400 to 1200 square meters of surface area, comprising up to 98% of it internal structure.

Pore structure has several classifications: Micro-pores (<1 nm), Mesa-pores (1 to 25 nm) and Macro-pores (>25 nm). Mesa-pore AC is well suited for mercury adsorption. AC is also classified by its particulate size range. Generally AC in powdered form of 50 mesh and finer particulate size is referred to as pulverized activated carbon (PAC) and the granular form of 4 to 50 mesh particulates is referred to as granular activated carbon (GAC).

As previously stated, carbon can be thermally or chemically activated. Chemical activation can be considerably more costly and thermal activation is the current preferred method for producing AC suitable for mercury removal. Thermal AC production methods include rotary hearth furnaces, rotary calciners, and various other forms of calciners and other heat-treatment apparatuses. One of the most common methods of AC product (FIG. 1) can be characterized by two processing stages. The first stage is composed of thermal devolatilization, decomposition, or carbonization of the carbonaceous feed material. The second stage is the gasification or activation of the carbonized char material. Though these stages imply that devolatilization and activation are separate reactions they do in reality overlap to a large degree depending on process conditions. A portion of the carbonaceous feed is invariably activated during devolatilization. Likewise a portion of the carbonaceous feed is further or more completely devolatilized during activation.

In the devolatilization step, moisture, hydrogen and oxygen are removed from the carbonaceous feed material to open existing pore structure in the carbonaceous feed. During activation, oxidizing gases such as steam, $CO_2$, or oxygen is used to complete devolatilization and create new additional pore structure through partial or selective gasification of carbon in the devolatilized feed. It is well documented that activation by definition is a selective gasification reaction. The terms activation, gasification and partial combustion or oxidation are very closely related and in many cases have overlapping meanings. Thermal activation is most often accomplished in direct fire rotary kilns or multi-hearth furnaces, often reaching temperatures greater than 1000 degrees Centigrade.

While thermal activation is the most widely used method of AC production and has a long and proven track record, operational and capital cost remain high. The cost of existing thermal activation methods is considerable due to the current cost of capital, energy, emissions control and waste disposal. Indeed, devolatilization and activation of material with carbon content typically is thermally treated at temperatures in the general range of 600-1200° C. (1112-2192° F.) over long periods of time and in multiple stages. The time required in each stage can range from minutes to hours.

Newer concepts for AC production have emerged in which AC is produced in a single reaction vessel through what the inventor terms as "flash activation" processes which refers to any process scheme where devolatilization and subsequent activation reactions require only seconds to complete. These flash activation processes use the principle of rapid devolatilization with heat, moisture, and other oxidizers. Such methods results in varying degrees of concurrent char formation and activation commonly found in partial combustion reactions, coal gasification, and other similar devolatilization schemes.

Regardless of the scheme used for flash activation, carbonaceous feed, air, heat, and oxidizers such as $CO_2$, $O_2$ and moisture, are reacted in a gaseous environment. This reaction produces suitable conditions for devolatilization and activation reactions. Many calciners and other heat-treatment vessels could be operated to produce an activated char product of varying degrees of activation using the flash activation principle. For example the KBR Transport Reaction Vessel Gasifier is a known method of coal gasification. Such a method would produce an activated carbon if the process conditions were altered to favor partial gasification of the carbonaceous feed. Therefore the principle of rapid and concurrent devolatilization and activation (i.e., flash activation) is not in itself unique. It is the quality of the produced AC and the successful commercial adaptation of this principle which are the most important factors.

Some examples of the adaptation of this principle called by various different names include the "Thief Method for Production of Activated Carbon," the "Sorbent Activation Process (SAP)," and the "PraxAir Hot Oxygen Burner (HOB) PAC Production Method" among others. These methods tie this fundamental devolatilization and activation principle to specific apparatuses such as a boiler, coal power plant flue gas flow, or burner design. However, these methods have not yet demonstrated commercial production capability and do not produce an AC with comparable yield, composition, and overall quality as traditional thermal AC production methods. This is due in part to the general over simplification the complex process variables and reaction vessel design. The prior art does not teach effective reaction vessel design required to produce the optimal reaction vessel thermal, particulate flow, and oxidizing and reducing condition profile necessary to better control process reaction conditions. Furthermore, it often is difficult to control the inadvertent loss of carbon through excessive gasification reactions in heretofore known thermal flash activation processes. The excessive loss of carbon reduces the product yield raising production costs considerably and greatly increases the residual ash content thereby further diminishing the AC product quality. Therefore, the consistent production of the highest quality AC with good product yield (and/or AC of unique or different activation characteristics and applications) remains elusive, particularly on industrial scales of production.

Thus, there is a need for a rapid and less costly way to produce activated carbon of high quality and/or different activation characteristics and that allows for more precise and versatile controlling of the devolatilization and activation process conditions.

SUMMARY OF THE INVENTION

It has been discovered that under certain thermal treatment conditions where the starting material, a conveying means, and a gas (e.g., re-circulated combustion flue gases, air, carbon dioxide, and/or steam) flow to a Reaction Vessel such that the carbon feedstock is introduced into the Reaction Vessel mixed with a tangentially introduced gas creating a gaseous rotational velocity of at least 90 RPM, most notably, during flash calcination utilizing technology similar to U.S. Pat. No. 7,264,781 B2, a cyclonic flow is created that results in conditions that are tightly controllable such that charred, devolatilized, and/or more fully activated carbon can be generated from carbonaceous feed sources. This method of activation, referred to as flash activation by the inventor, utilizing adapted and new flash calcination technology will hereafter be referred to as flash activation and will subsequently be described in further detail.

The flash activation of the invention can be practiced in calcination Reaction Vessels. Calcination is by definition a form of thermal treatment in which a material undergoes a chemical change and usually refers to the devolatilization of chemically combined components in the material. Particulate material can be effectively calcined by entraining the material in a gaseous medium and heating the material. This procedure, described as flash activation in the invention, is carried out in different ways depending on the specific calcining characteristics of the material being calcined.

Almost all calcining methods involve the three operations of preconditioning, calcining and cooling. Preconditioning may include the steps of reducing particle size, screening and drying, and the purpose of preconditioning is to produce a uniform, free-flowing substance for the calcining operation. Calcining can be performed utilizing equipment of various designs and, following calcination, the calcined product is separated from the gaseous medium in which calcination took place. The calciner Reaction Vessel (Reactor) and separation cyclone are considered one continuous reaction vessel (Reaction Vessel) since reactions in a pneumatic transport gas flow can proceed until the particulate product is disengaged from the Reaction Vessel gases. While the term Reaction Vessel is used in the description below, it should be understood that the methods of the invention may be practiced in systems having one or more Reaction Vessels alone or Reaction Vessel(s). The calcined product is then cooled and deposited in a storage vessel.

It has been discovered that providing an activation medium (i.e., water or a water-containing substance) to a particulate coal feedstock such that its moisture content is equal to or greater than the feedstock's naturally occurring (i.e., prior to being mined from the earth) content provides certain benefits during the activation process.

Thus, in one embodiment, a method for producing activated carbon from a particulate coal includes the steps of loading a particulate coal feedstock with an activation medium such that the water content of the particulate coal feedstock is equal to or greater than that of the coal feedstock's naturally occurring state, conveying the particulate coal feedstock into a heat treatment system, and heat treating the particulate coal feedstock such that at least partial activation occurs.

In another embodiment, a system for producing activated carbon from a particulate coal feedstock is provided that includes a mixing chamber with an activation medium inlet, a heating chamber having a heat source, a cyclone, and a gas conveying means that conveys the particulate coal feedstock and is in fluid connection with the mixing chamber, heating chamber, and cyclone.

A few of the key factors required in the methods of the invention to produce high quality activated carbon with good yields and other unique qualities include:

1. A key factor in the method of the invention is the ability of the flash activation system to accomplish both devolatilization and subsequent activation reactions of carbonaceous feed material in a single Reaction Vessel (Single-Stage Activated Carbon Production) or in two separate Reaction Vessels (Dual-Stage Activated Carbon Production).
2. The carbonaceous feed sources can include various particulate hydrocarbons such as various forms of coal, such as lignite coal, which may be ideally suited. Other particulate feedstock materials include cellulous-based materials including wood fibers, coconut shells, etc. Many other carbohydrate feed materials may also be possible.
3. Another key factor relating to the carbonaceous feed is the control of particulate feed size distribution. The control of the particulate feed size distribution is important because the rate of devolatilization and activation varies widely depending of particle size. Therefore granular feed material and pulverized feed material will experience different rates of heating, devolatilization and activation when heated at the same time and under the same conditions. In most cases the finer feed will experience excessive activation or gasification resulting in product loss while the more granular feed will experience a lesser degree of activation leading to a reduction in product quality. Carbonaceous feed particulate size should be within a predetermined standard size deviation from the mean particle size for a particular carbonaceous feed type. The inventor has determined that the following carbon feedstock ranges in uniformity of size are particularly preferred:

at least 90% of the feedstock is within one-half an order of magnitude in size for particles coarser than 0.40 mm at least 90% of the feedstock is within one-quarter an order of magnitude in size for particles 0.40 mm or smaller in size If feedstock overlaps these size ranges, having at least 90% of the particles within one-half to one-quarter an order of magnitude in size.

4. Various techniques can be utilized to introduce carbonaceous feed into the flash activation Reaction Vessel. These techniques include operating the burner in such a manner that the fuel, such as coal, is partially combusted under oxidizing to reducing conditions thereby resulting in devolatilized char formation and injecting the carbonaceous feed material directly into the hot burner gases. The most preferred method is the pneumatic injection the carbonaceous feed material tangentially around the hot burner gases down stream of the process burner creating a cyclonic flow through a significant portion of the Reaction Vessel. Alternatively carbonaceous feed material can also be mechanically conveyed to the Reaction Vessel and mixed immediately upon entering the Reaction Vessel with a flow of air, FGR, other gases or a combination, that were previously or concurrently introduced into the Reaction Vessel thereby creating the desired cyclonic feed material flow pattern.

5. Another key factor is the need to prevent carbonaceous feed particulates from undergoing adverse reaction conditions such as overheating and/or favoring partial combustion reactions thereby affecting the yield and pore structure. The process must also be able to retain the coarser feed material longer than the finer material. This can all be accomplished by the cyclonic flow pattern within the Reactor created by the injection of carbonaceous feed either mechanically or pneumatically and using a conveying gas and/or the injection of second gas such as re-circulated flue gases or steam to create a cyclonic material flow pattern. Cyclonic gas flow rotational velocities within the Reactor should be a minimum of 90 RPM average velocity and more ideally in the 120 to 240 RPM range. Cyclonic flow in the Reactor in conjunction with the feed conveying gas and or secondary gas composition creates a more uniform AC product by buffering the carbonaceous feed from excessive Reaction Vessel temperatures caused by the burner flame and/or from excessive partial combustion of the feed. By utilizing this method, adverse carbon particle surface reactions, ash fusion, excessive gasification and product loss is avoided. In addition cyclonic flow in the Reactor increases particulate retention time by creating a helical material flow pattern thereby increasing the particle path length.

6. Pneumatic conveying carbon feedstock into a flash activation Reaction Vessel utilizing a mixture of a conveying gas and a second gas. This results in the ability to control the Reaction Vessel flow profile in which devolatilization and activation predominately occurs in distinct regions of the Reaction Vessel. By controlling the rate of addition, moisture percentage, and/or activation content of a second gas independently of the conveying gas, the reaction time, temperature, oxidizing and reducing conditions, and other aspects of the devolatilization and activation process stages can be controlled using a single or multiple vessels. Alternatively carbonaceous feedstock can be introduced into the Reaction Vessel using mechanical conveying and immediately thereafter mixed with a air/gas source with the desired composition and volume within the Reaction Vessel. The air/gas source can be concurrently introduce with the feed material or injected previous to the material feed. This would enable the creation of substantially similar material flow conditions within the Reaction Vessel achievable with pneumatic conveying.

7. Another key factor is the Reaction Vessel size. Different carbonaceous materials require differing retention times for proper devolatilization and activation. Since the Reaction Vessel is a fixed geometry retention time requirements can only be primarily controlled by particle size, gas flow rates and cyclonic rotational velocities. Proper sizing of the Reaction Vessel for a given type of carbonaceous feed and desired level of activation is required. Calculated retention time requirements, minimum conveying gas velocities, and favorable cyclonic rotational velocities are used to determine the Reaction Vessel sizing constraints. The inventor has determined that the reactor inside geometry is preferably 6 to 1 (length to diameter) or greater with 4 to 1 being considered the minimum.

8. Another key factor is the ratio of heat provided by the burner and the rate of heat provided by the carbonaceous feed stock. The heat provided by the burner includes all heat sources passing through the burner such as various fuel sources, air temperature, flue gas re-circulation, etc. The percentage of heat from the burner can range from 20% to 60% of the total heat required with the remaining heat provided by the partial combustion of the carbonaceous feed stock. Also, the heat generated through the burner should be between 4,000 to 10,000 BTU per pound of activated carbon.

9. Another key factor is the ratio of the total moisture from all sources (i.e. from products of combustion, feed moisture, injected moisture, flue gas recirculation, etc) to the carbonaceous feed (dry basis). This ratio should be a minimum of 1.1 lb moisture per lb carbonaceous feed (dry basis) with 1.5 to 2 lbs moisture per lb of carbonaceous feed (dry basis) being more ideally suited for many carbonaceous feed materials.

10. The design of the Reaction Vessel, which again is defined as the vessel(s) from carbonaceous feed injection through to the product disengagement and separation from reaction gases, must create an oxidizing environment transitioning to a reducing environment. For many precursor materials the initial oxidizing environment prior to transitioning to a reducing environment can be beneficial as a pretreatment of the feed material surface area immediately prior to activation as an additional means to control adverse reactions. When utilizing Single Stage Activated Carbon Production in a single Reaction Vessel, devolatilization occurs in an oxidizing transitioning to a reducing environment and the activation occurs in primarily a reducing gas environment. To assist in creating distinct regions additional gases such as air, re-circulated flue gas, and/or moisture can be added at various points along the gaseous flow path of the Reaction Vessel thereby creating distinct reaction zones within the Reaction Vessel. When utilizing Dual Stage Activated Carbon Production in multiple Reaction Vessels, activation occurs in an oxidizing transitioning to a reducing environment in a single Reaction Vessel. The devolatilization occurs in primarily a reducing gas environment in a separate Reaction Vessel which utilizes the separated flue gases from the first Reaction Vessel as the heat source. To assist in creating distinct regions when utilizing Dual Stage Activated Carbon Production additional gases such as air, re-circulated flue gas, and/or moisture can be added at various points along the gaseous flow path of either or both of the Reaction Vessels.

11. When starting up and shutting down the system, a method is required that can rapidly control temperature spikes in the activating region of the Reaction Vessel during transition from oxidizing to reducing conditions and vice versa. On start up the temperature spike is caused by excessive carbonaceous feed combustion until excess oxygen is depleted. Upon shut-down temperature spike occurs due to hot residual carbon in the Reaction Vessels burning when excess oxygen becomes available.

12. Moreover, by including a co-product industrial mineral to be calcined, such as magnesium, trona, or calcium carbonate, a calcination product (e.g., lime) can be produced simultaneously with the activated carbon and can further be a source of temperature control due to the endothermic nature of calcination. The co-produced or co-product industrial minerals are defined as minerals that are capable of undergoing calcination under the same operating conditions as the carbon being heat treated and that represents at least 50% of the heat-treatment system output in terms of quantity. So, for example, limestone is introduced with the carbon being heat treated in sufficient quantity that it results in at least 50% of the output (in the form of lime) in addition to activated char. Thus, co-product industrial minerals are to be distinguished from mere "enhancers," which are added to the system but do not result in a separate "co-product" in any appreciable amounts (and certainly not over 50% of the system output of products). For example, adding a bromide dopant to the carbon would be considered a an enhancer and not a co-product industrial mineral because mainly brominated carbon results, with no other "co-product" making up at least 50% of the system output of products. Of course, the co-product industrial minerals can add to the effectiveness of the AC. For example the removal of sulfur in coal power plant flue gases with lime can benefit the ability of AC to adsorb mercury. Another example is the industrial mineral commonly referred to as trona where when co-calcined with AC can benefit the mercury adsorption by not only removing sulfur compounds but by also adsorbing mercury in the trona pore structure created during calcination.

13. Moreover by including a metallic mineral, oxides, or salts such as iron compounds, nickel compounds, or other mineral compounds a slightly magnetic or paramagnetic AC can be produced which may be beneficial for separation of spent AC from fly ash when the AC is used for mercury control in coal fired power plants.

14. Furthermore, this method of AC production lends itself to pre-activation halide compound treatments, such as bromination. This treatment can occur in several ways such as the premixing of halide salts such as sodium bromide, calcium bromine or iron bromide or a combination of halides with the carbon precursor material resulting in the concurrent activation and halide treatment of the AC. Due to the thermal treatment conditions, the concurrent activation and halogenation of the carbon precursor can have a positive impact on the effectiveness of the halogenation of the activated carbon.

15. Additionally, another unique method of AC halogenation can be utilized when flash activated AC has been produced concurrently or simultaneously with an industrial mineral such as calcium oxide as previously described or has been pre-mixed with a metallic mineral, oxide or salt or a combination of two or more of these compounds. This method reacts the co-product AC with a halide acid resulting in a halogenated product consisting of halide salt(s) (i.e. Calcium bromide, iron bromides). Some halide salt enhanced AC products can have paramagnetic properties which may be beneficial when magnetic separation of the spent enhanced AC from ash by-products is desired. An example of a potential use of magnetic separation could occur when enhanced AC is used for mercury removal from coal fired power plants.

Overall there is a need for a process that can significantly reduce the capital cost requirements for AC production and processing and that is inherently stable, easily adjustable, and precisely repeatable.

Additional features and advantages of the invention will be forthcoming from the following detailed description of certain preferred embodiments when read in conjunction with the accompanying drawings.

DESCRIPTION OF THE PREFERRED EMBODIMENTS

Figure 1:
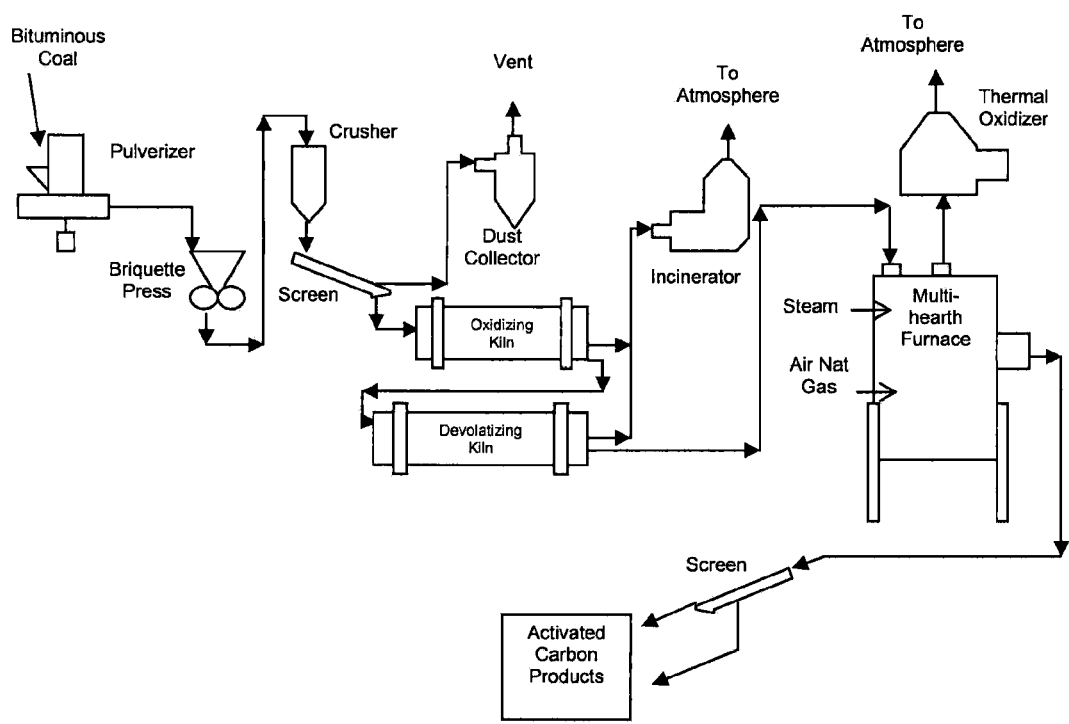
FIG. 1 schematically illustrates an activation system (for example, a calcining plant) of the prior art.
Figure 2:
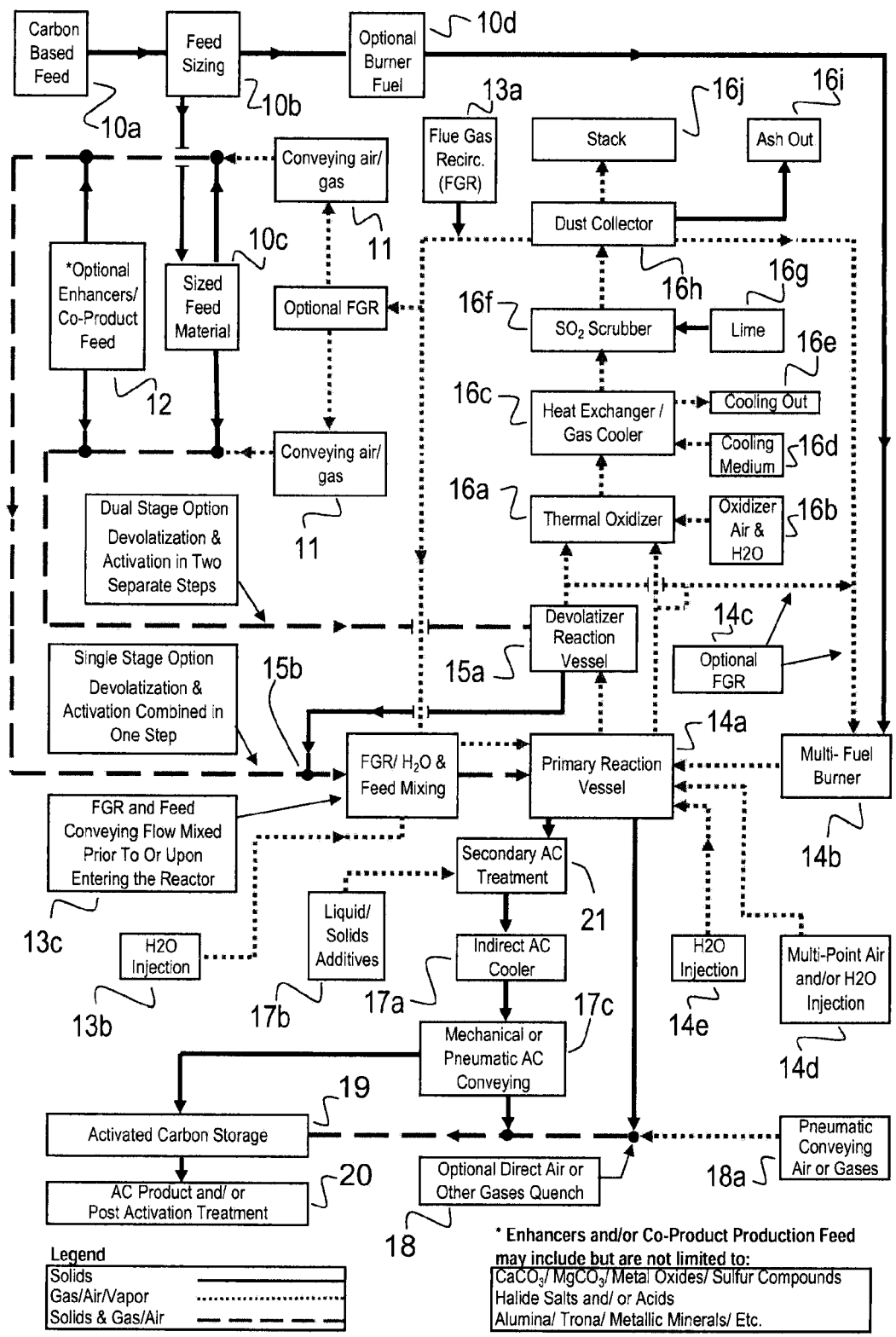
FIG. 2 illustrates an overview flow diagram of a system and methods according to the invention.
Figure 3:
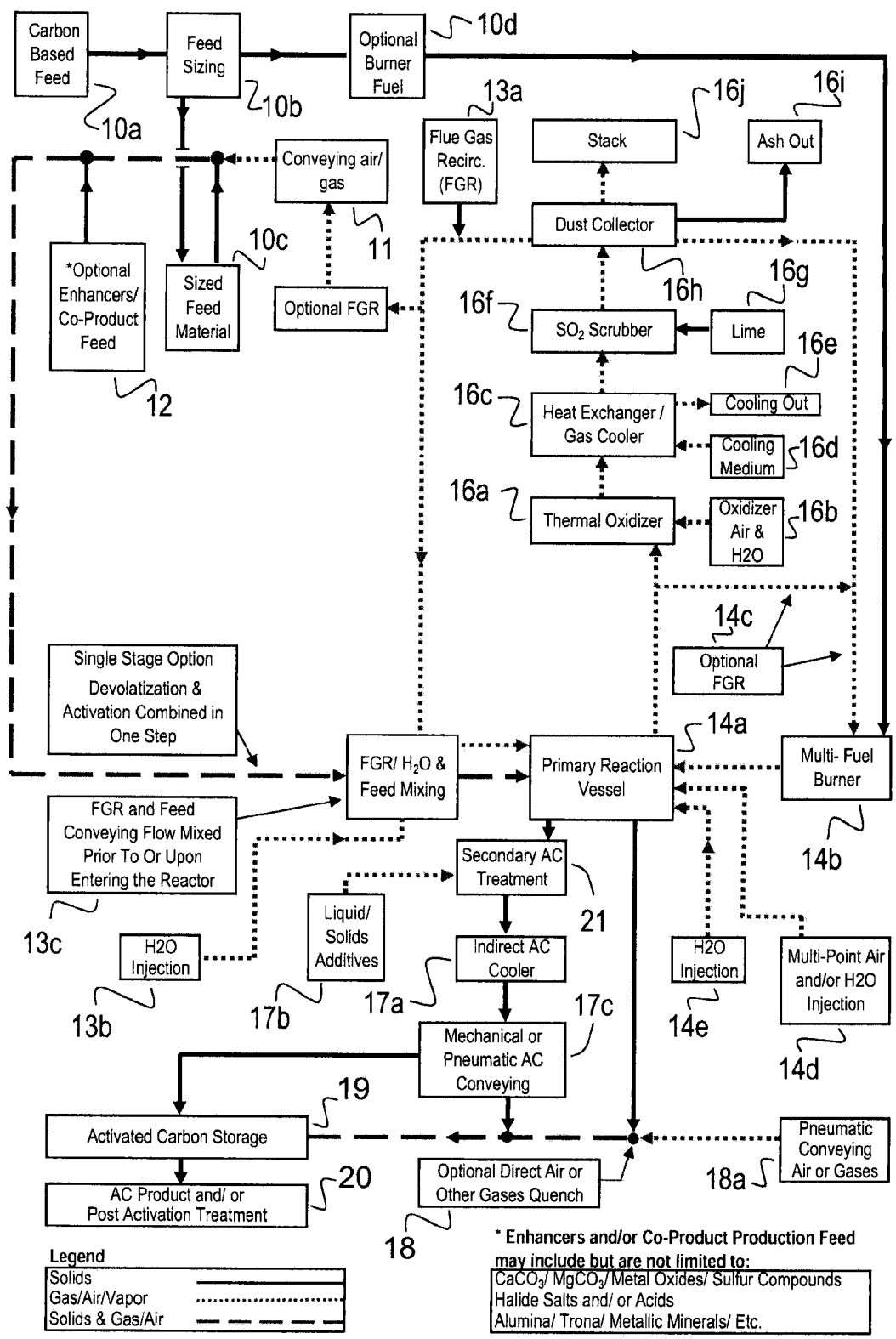
FIG. 3 illustrates a flow diagram of a single-stage method according to the invention.
Figure 4:
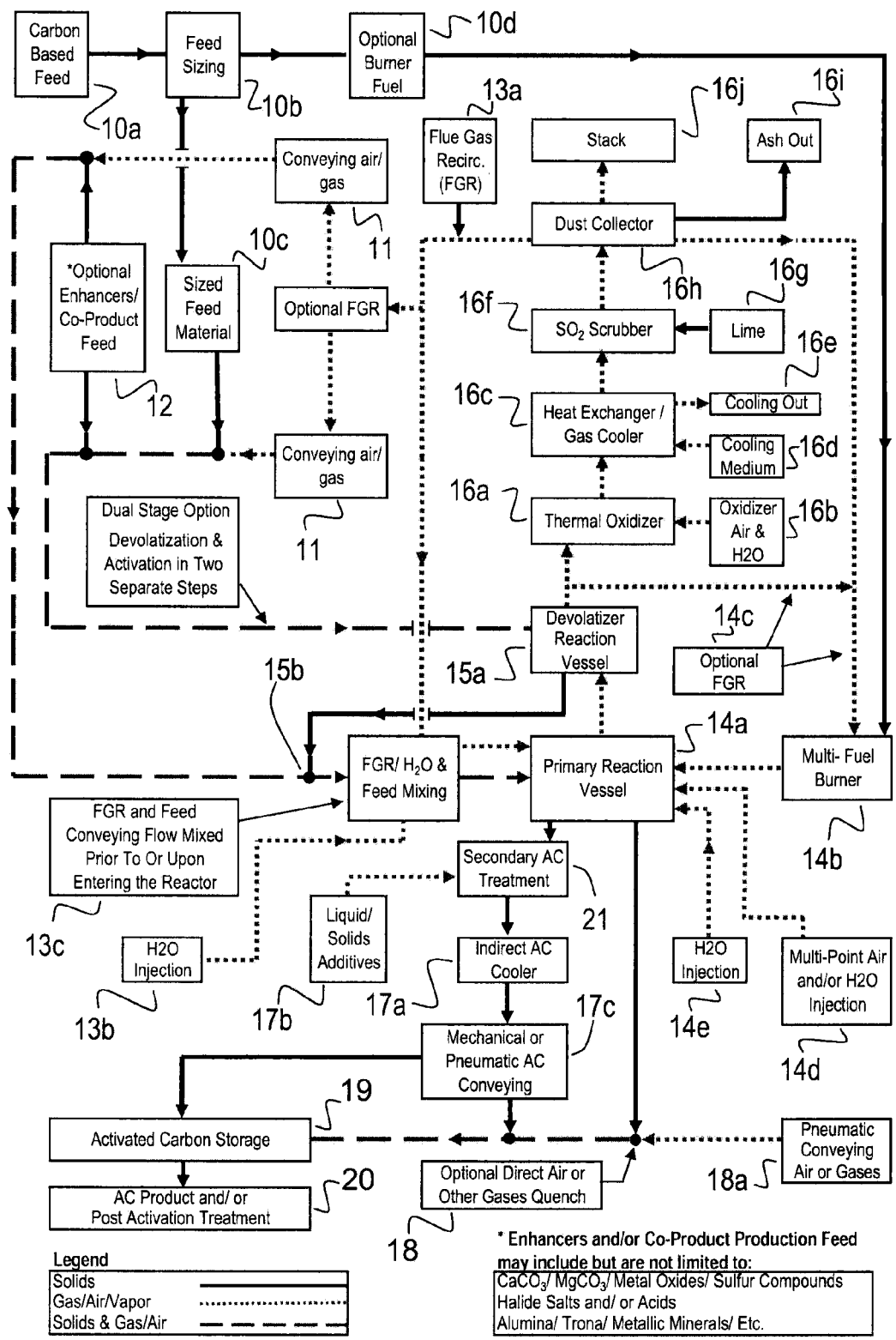
FIG. 4 illustrates a flow diagram of a dual-stage method according to the invention.

Processes according to the invention can be divided into the following main categories: 1) Carbonaceous feed material (feedstock) preparation, 2) Calcination or other heat treatment, 3) Activation, 4) Post activation treatment, 5) Process gas conditioning, and 6) Optional AC enhancement practices. The calcining stage can accomplish both devolatilization and subsequent activation reactions of carbonaceous feed material in a single Reaction Vessel (Single-Stage Activated Carbon Production) or in two separate Reaction Vessels (Dual-Stage Activated Carbon Production). Each of the following sections corresponds to the Process Block Flow Diagram of FIG. 2 (with the same numbers indicating like parts/processes in FIGS. 3-4).

Carbonaceous Feed Material Preparation 10a-10d

A first embodiment of the invention can produce a combination of granular and pulverized AC utilizing a variety carbonaceous feed stock material. A blend of carbonaceous materials can also be created to tailor the properties of the AC. Materials that can be used include coal, biomass, and petroleum based material. The type of feed material utilized depends on the intended use of the AC since each material produces or has unique adsorption characteristics. For example, lignite coals when activated produces an AC with excellent vapor phase mercury adsorption characteristics;

while a biomass such as coconut shells produce an AC with some of the highest overall adsorption capabilities.

Preparation of the feed material 10b varies depending on feed stock and the desired end product. Generally, the inventor's activation technology has shown that producing a more granular AC is the most effective since a good quality product can be produced and the AC can be further ground if necessary. Therefore even though the process does not require exclusively granular feed to produce AC, process advantages and product quality do indicate that the highest quality AC can be produced using granular feed with a defined feed size distribution. Moreover, feedstock granules of at least 240 mesh or greater in size is best. A typical feed preparation for lignite coal would include primary crushing followed by subsequent roll crushing to minus 10 mesh. Roll crushing is often preferred over other crushing methods since it produces the least amount of fines. Crushed material can be screened with the oversized material being re-circulated to the mill if required. Material substantially finer than 120 mesh can be processed separately to produce an AC with different characteristics. Prepared feed material is stored in a silo or hopper. Moisture in the carbonaceous feed material 10a can also be beneficial to help buffer the carbonaceous feed material from various adverse early reaction conditions in the Reaction Vessel 14a and/or 15a due to excessive initial Reaction Vessel temperatures. Free moisture content of the carbonaceous material will be limited by the particle size and flow characteristics of the feed material. Feed material 10a must remain free flowing to properly feed, convey, and disperse into the Reaction Vessel cyclonic flow.

Fine feed material of less than 120 mesh tends to devolatilize and activate significantly faster than coarser granular feed resulting in fines being over activated or gasified resulting in not only product loss but increased residual ash. The gasification of fines also leads to excessive loss of activating gases thereby diminishing the quality of remaining AC particulates. Further compounding these issues is the loss in efficiency and process capacity. In general every pound of carbon gasified or carried out of the system increases the flue gas conditioning required. This increased gas conditioning requirement further reduces plant production capacity. As a rule every pound lost through carry over or excessive gasification may result in much more than a pound of lost production capacity.

The hopper or silo 10c preferably is a mass flow type that refers to a hopper in which the first product in will be the first product out. This hopper acts as a receiver for prepared carbonaceous feed material that is to be carefully metered to the calciner. The hopper provides surge capacity for constant, uninterrupted material feed to the calciner. As the hopper level lowers, the carbonaceous feed from the grinding circuit is proportionally increased and vice versa. This allows grinding circuit to run intermittently and provides time for maintenance. The material being discharged and metered from the hopper is introduced into a pneumatic conveying line and conveyed to the calciner Reaction Vessel. Of course, a calciner is used as an example activation system, and the methods of the invention can be practiced in other systems suitable for heating a particulate carbon feedstock to form an activated carbon as herein described.

In situations where gas or fuel oil is not available for the Reaction Vessel multi-fuel burner 14b or are limited either for economical or logistical reasons and when coal is utilized as the carbonaceous feed it is possible to divert a portion of the carbonaceous feed 10d and prepare it for use as a primary or secondary fuel in the multi-fuel burner 14b.

Conveying Gas and Blowers 11

A conveying air/gas blower 11, which can include air, re-circulated flue gases (FGR), other gases or a combination, can be utilized to convey the carbon feedstock to the Reaction Vessels(s) 14a and/or 15a. The carbon feedstock can be also mechanically conveyed to the Reaction Vessels(s) and mixed immediately upon entering the Reaction Vessels(s) with a cyclonic flow of air, FGR, other gases or a combination, that were previously or concurrently introduced into the Reaction Vessels(s), thereby creating the desired cyclonic feed material flow pattern.

Activated Carbon Enhancers and/or Simultaneous Co-Product Production 12 and 20

One aspect of the invention is the simultaneous production of activated carbon with other industrial minerals, metallic minerals, oxides, and salts to produce an "enhanced AC" (EAC). This simultaneous production of various materials followed in some cases by additional acid or base treatment creates a ready to use multi-functional EAC blend with unique characteristics such as $SO_2$ removal, paramagnetic properties, halogenation, or EAC with low foaming indexes to name a few examples. The presence of many of these co-products during activation can also in some cases enhance the physical AC pore size distribution and adsorption properties. Alternately, the co-product feed and the carbonaceous feed can be mechanically premixed and metered to the system from the same feed location.

The inventor has separated the enhancement of AC using flash activation into three basic categories:

The first category is the simultaneous or co-produced AC products where each component could be produced separately using flash calcination but are produced concurrently. The co-product AC production includes industrial minerals such as lime, trona, alumina, and clay. One example of a simultaneously produced co-product AC is calcium oxide (lime) and activated carbon. The inventor's technology was initially developed for the calcination of industrial minerals such as lime, trona, alumina, and clay, with lime being the most thoroughly developed. The utilization of flash activation to simultaneously calcine lime and devolatilize and activate AC has proven very effective. Such a product is suitable for $SO_2$ and Hg removal in power plants.

The second category includes additives to the carbonaceous feed material to enhance the AC during activation but that would not typically be flash calcined by themselves. These include metallic minerals, oxides and salts. An example of this would be the addition of sodium bromide to the carbonaceous feed material and flash activating the mixture to produce a well halogenated AC with numerous enhanced characteristics derived from the concurrent activation and halogenation of the AC. Halogenated AC is most often utilized for its ability to oxidize vapor phase contaminates such as elemental mercury from coal fired power plant flue gas emissions. Another example of this second category is the addition of a metallic metals or oxides to the carbonaceous feed material. This mixture when heated at activation temperatures and under activation conditions can produce a uniformed metal rich AC which can serve as a catalyst or as a precursor for additional AC treatment. Such an AC product can be engineered to be magnetic or paramagnetic.

The third category is the post treatment of AC produced under either of the first two categories using an acid or base or a combination. An example of this is the reaction of lime enhanced AC with hydrobromic acid producing a halogenated (calcium bromide) enhanced AC. Another example of this third category is the treatment of an iron enriched AC with hydrobromic acid to produce a halogenated (iron (II or III) bromide) AC with paramagnetic properties.

Introducing Carbonaceous Feed to the Process Mixed with a Second Gas, e.g., Flue Gas Recirculation (FGR) 13a-13b A second gas 13a, e.g. re-circulated flue gases (FGR), may also be mixed with the blower 11 or inject directly into the Reaction Vessel 14a to provided additional gas flow required for proper cyclonic rotational flow velocity and flow profile within Reaction Vessel 14a. This enables independent control of FGR 13a rate without affecting material feed conveying. The FGR is an excellent source of activating gases due to its high moisture and significant amounts of $CO_2$ along with favorable low amounts of $O_2$. Since the presence of excess oxygen consumes carbon the utilization of FGR can help suppress early combustion reactions.

Moisture 13b and other aspects of the second gas, e.g., FGR 13a, can be adjusted. This allows the operator to change and control the heating environment such that a wide variety of reaction conditions and products is achievable. This also provides the carbonaceous feed material with an additional buffer against early peak flame temperatures and adverse reactions encountered during the initial injection.

The carbon feedstock 10a can be conveyed to the Reaction Vessel 14a using conveying air/gas blower 11, FGR 13a, other gases or a combination, mixed prior to or upon entering the Reaction Vessel 14a (as shown by box 13c) to convey the carbon feedstock to the Reaction Vessel. Although pneumatic conveying is the preferred method of introducing the carbonaceous feed material into the Reaction Vessel, feed material can also be mechanically conveyed to the Reaction Vessel and mixed immediately upon entering the Reaction Vessel with a flow of air, FGR, other gases or a combination, from blower 11, FGR 13a and/or 13b that were either previously or concurrently introduced into the Reaction Vessel thereby creating the desired cyclonic feed material flow pattern.

In addition, as previously mentioned, moisture in the carbonaceous feed material 10a can also be beneficial to help protect the carbonaceous feed from adverse early reactions. High moisture yet free flowing carbonaceous feed will be beneficial whether using FGR, air, other gases, or a combination to create and maintain the cyclonic feed material flow.

The flow rate of 11, 13a and 13b provide the motive force required to create the cyclonic flow within Reaction Vessel 14a. The cyclonic flow in the Reaction Vessel 14a in conjunction with the feed conveying gas and or secondary gas composition creates a more uniformed AC product by buffering the carbonaceous feed from excessive Reaction Vessel temperatures caused by the burner flame and/or from excessive partial combustion of the feed. This is due to centrifugal forces acting on the particles in such a manner that they travel in close proximity to the Reaction Vessel walls. This allows a more gradual blending of feed material and hot burner combustion gases thereby improving the yield and carbon pore structure development. The cyclonic flow also enables the Reaction Vessel to retain the coarser feed material longer than the finer material. Cyclonic gas flow rotational velocities within the Reaction Vessel should be a minimum of 90 RPM average rotational velocity and more ideally in the 120 to 240 RPM range in the "burn" or oxidation zone of the Reaction Vessel. By utilizing this method, adverse carbon particle surface reactions, ash fusion, excessive gasification and product loss is avoided. In addition cyclonic flow in the Reaction Vessel increases particulate retention time by creating a helical material flow pattern thereby increasing the particle path length.

The Reaction Vessel 14a has both oxidizing and reducing conditions in which devolatilization and activation predominately occur in distinct regions of the Reaction Vessel. The control of the cyclonic gas flow rate, moisture percentage, and/or activation content can change the oxidizing to reducing transition profile. These in turn also affect the cyclonic rotational speed, reaction time, temperature, oxidizing and reducing conditions, and other aspects of the devolatilization and activation process. Therefore the air and gas flows from 11, 13a and/or 13b are critical for generating optimal Reaction Vessel flow conditions.

Single Stage Activated Carbon Production 14a-14e

The Reaction Vessel 14a is the heart of a pneumatic flash calciner (PFC). As previously mentioned, the calcination of carbonaceous material to produce AC can be classified as two distinct steps. The first step is generally considered devolatilization where moisture and volatile carbonaceous compound are driven out of the feed material particulates. The second step is the activation of the remaining carbon char particulates using and activating gas such as $H_2O$, $CO_2$, and/or $O_2$. As previously stated, though these steps imply that devolatilization and activation are separate reactions they do in reality overlap to a large degree depending on process conditions. A portion of the carbonaceous feed is invariably activated during devolatilization. Likewise a portion of the carbonaceous feed is further or more completely devolatilized during activation.

The activation reactions include but are not limited to the following;

Primary Activation Reaction Examples:

$$C+H_2O >> CO+H_2$$

$$C+CO_2 >> 2CO$$

$$C+O_2 >> CO_2$$

Secondary Activation Reaction Examples:

$$CO+H_2O >> CO_2+H_2$$

$$2CO+O_2 >> 2CO_2$$

An aspect of the invention is a unique stand alone production method for producing AC that utilizes rapid devolatilization in a conditioned high temperature gaseous environment suitable for immediately subsequent and/or concurrent carbon activation. This is referred to as "Single-Stage" AC production.

During the stage, portions of the carbonaceous feed undergo devolatilization while other devolatilized portions of the particulate material are advancing to be activated. This enables the particulate feed material to devolatilize and activate in rapid succession. The retention time required for complete devolatilization/activation are temperature and pressure dependant but can generally be accomplished within two to fifteen seconds. The temperature required again depends on the type of carbonaceous feed material utilized but in general ranges from between 1200 and 2100 degrees Fahrenheit. The Reaction Vessel is operated under oxidizing transitioning to reducing conditions to maximize AC yield and production rates. The pressure is generally maintained near atmospheric conditions. Also, the heat generated through the burner should be between 4,000 to 10,000 BTU per pound of activated carbon.

The main calcine Reaction Vessel 14a is generally a vertical, round, open chamber fitted with a centrally mounted vertically oriented burner 14b. The burner provides the heat input necessary for calcining. The burner is fired under stable oxidizing conditions with gas/oil or coal fuels. Reducing conditions in the calciner Reaction Vessel occur when the carbonaceous feed material consumes the remaining excess air thereby creating an oxygen deprived environment. The main reasons the burner is operated under oxidizing conditions is to promote stable operation and to ensure that the AC produced is not excessively contaminated with carbon from the burner fuel sources which have been exposed to substantially different conditions. Operating the Reaction Vessel to transition and operate under reducing (oxygen depleted), activation favorable ($CO_2$ and Moisture laden gases), conditions requires the produced AC to be separated from the activating gases at elevated temperatures. The reducing conditions also require the separated gases to be subsequently oxidized to destroy the resulting CO and other volatile gases. Flue gas recirculation 14c can also be utilized with the burner from several sources such as after the flue gases has been oxidized to help control burner flame temperatures. Alternatively FGR can be supplied via 14c from after the Reaction Vessels 14a or 15a still having considerable amounts of combustible gases available to lower the fuel requirements of the burner 14b.

As described above, the preferred method for introducing feed material into the Reaction Vessel is to convey the material pneumatically. Whereby the feed material from the metering feeder at the bottom of the feed hopper(s) is conveyed with air and mixed with a mixture of a conveying gas 11 and a second gas 13a (e.g., re-circulated flue gases, a.k.a. flue gas recirculation (FGR)). This pneumatic stream is introduced into the calciner tangentially at either a single point or multiple points. The second gas such as FGR enhances the conditions required for good activation by providing the Reaction Vessel with additional $H_2O$ and $CO_2$ required for activation. The tangential injection produces a cyclonic upward flowing vortex. This vortex traveling vertically upward allows the material to act as a buffer between the Reaction Vessel walls and the extremely hot burner gases. As the material is conveyed vertically the Reaction Vessel gas temperature is lowered, and the material temperature is raised to the point of de-volatilization and activation. The vortex allows coarse material to be retained slightly longer than the finest, producing a more uniformed AC product. This process is capable of a wide turn down ratio and can utilize various fuels.

The Reaction Vessel 14a is equipped with supplemental air and/or moisture injection ports 14d at various points along the Reaction Vessel. These injection ports allow additional flexibility and control in maintaining flow profiles and for modifying oxidizing and reducing zone conditions. The greater flexibility enables well defined reaction regions in the Reaction Vessel to be developed.

The vertically oriented burner 14b is equipped with a cleanout mechanism on the bottom to allow for the continuous or intermittent removal of difficult to convey materials that have fallen out of the calcining pneumatic flow. The material discharged from the burner can either be discarded or conditioned and returned to the system. The temperature of the Reaction Vessel can be primarily controlled by the feed rate of the material. This means the higher the feed rate to the Reaction Vessel the lower the Reaction Vessel temperature and visa versa. This allows the burner to fire at near optimal conditions, and helps maintain gas flow consistency as well. The change in temperature is rapid when controlling with change in feed rate, and can change the temperature in a matter of a few seconds. Whereas, changing the temperature using air/fuel ratios is much slower, requiring minutes and potentially leading to the system modulating. Reaction Vessel temperatures can also be primarily controlled using moisture injection after the system has achieved stable operation. The calciner materials of construction are designed for operating temperatures in the range of 2400° F. and lower.

The material exits the top of the Reactor portion of the Reaction Vessel tangentially. The tangential outlet helps to sustain the vortex in the Reaction Vessel. The material exiting tangentially enters a high temperature cyclone separator portion of the Reaction Vessel. The tangential outlet helps improve the cyclone efficiency since the material is partially segregated from the gas flow as it travels along the outer wall of the Reactor portion of the Reaction Vessel and duct leading to cyclone. In the cyclone, temperatures are maintained at or above the minimum required activation temperature. It is important to separate the AC product from the gaseous products at elevated temperatures. This prevents the AC from picking up gaseous contaminates (that are adsorbable at lower temperatures) prior to AC discharge insuring a high quality product. Upon discharging the AC from the cyclone the material remains under reducing conditions.

During operation of the flash calciner, special considerations must be observed when transitioning from oxidizing conditions to reducing conditions and vice versa. A moisture injection system 14e is control looped to a temperature limit set point and is utilized to prevent system temperature from rapidly exceed high temperature limits under the described conditions.

When transitioning from oxidizing to reducing conditions, the increase in carbonaceous feed dramatically increases temperature until excess oxygen is consumed. After the excess oxygen is consumed, further increases in carbonaceous feed will lower temperature. Moisture will also buffer the temperature, thus allowing the system to remain at operating temperatures during transition. Alternatively, preheated combustion air can be bypassed in favor of ambient air thereby also reducing the process temperatures during transitions. Also FGR can be added in excess further helping to mitigate adverse combustion reactions associated with operating condition transitions.

When transitioning from reducing to oxidizing, residual carbon on the Reaction Vessel walls will immediately combust resulting in an undesired temperature spike. This will occur even if all feed and burner fuels are shut off as long as air continues to enter the system. Shutting all air, fuel and feed off will prevent much of the spike but will leave the system in a potentially combustible and hazardous state until cooled. The utilization of moisture injection 14e will again buffer the temperature during transition until residual carbon is consumed. Alternatively, preheated combustion air can be bypassed in favor of ambient air thereby also reducing the process temperatures during transitions. Also FGR either from 13a or 14c can be added in excess further helping to mitigate adverse combustion reactions associated with operating condition transitions.

Dual Stage Activated Carbon Production 15a-15b

Staging the production of AC can in some cases be beneficial. Staging means that the carbonaceous feed is first de-volatilized in a flash calcination stream and then activated in a separate flash calcination stream. The stages can be completely separate calcination units with separate exhaust streams or the stages can be incorporated into one unit and operated in series.

A single AC production plant with two stages would function similar to the inventor's patented Pneumatic Flash Calciner (PFC) technology where the waste heat stream from one stage supplies the heat for the second stage (for example, see U.S. Pat. No. 7,264,781). In this configuration the activation stage is the high temperature stage and the de-volatilization stage the lower temperature. The carbonaceous feed would enter the waste heat gas stream from the activation stage and subsequently devolatilize. The devolatilized carbon would then be feed into the activation stage. The activated carbon is then separated from the gas flows and discharged.

The dual stage process begins with the carbonaceous feed material 10 being conveyed pneumatically or mechanically into a devolatilization Reaction Vessel 15a. Pneumatic conveying of carbonaceous feed into the Reaction Vessel can utilize FGR gases as the conveying medium to help reduce carbon loss. Alternatively, ambient air can be utilized as the conveying air medium. Pneumatically introducing the feed into this Reaction Vessel is significant and very beneficial but not critical. The feed material enters this Reaction Vessel, which also carries process gases from the calciner Reaction Vessel 14a that still has considerable waste heat available. The material is dispersed into the gas flow that has sufficient heat available from the preceding activation stage to devolatilize the carbonaceous feed. The process gas stream remains deprived of oxygen which helps to reduce carbon loss and devolatilized char and gases are conveyed pneumatically into a cyclone separator. In the cyclone, the gases and solids are separated with the solids discharging into a surge hopper. The separated gases continue to the process gas treatment portion of the process. The surge bin acts as a receiver for devolatilized carbon feed material that is to be carefully metered to the activation Reaction Vessel 14a. The surge bin provides surge capacity for constant, uninterrupted material feed to the calciner Reaction Vessel. Feed material discharges from the bottom of the surge bin through a high temperature variable speed airlock.

The level in the surge bin is maintained by adjusting the carbonaceous feed rate from the primary feed hopper 10c at the beginning of the process. As the level lowers, the feed is proportionally increased and vice versa. This helps maintain a constant load on the system and avoids the problems associated with keeping the system balanced. The level monitoring method can be a direct contact type level indicator or the surge bin can be located on load cells. The surge bin is constructed out of materials designed to handle reducing gases and materials in excess of 1200° F.

The surge bin is also equipped to be able to return a portion of dried material to an upstream feed back-mixer if required to enable back mixing with the raw feed to dry the feed sufficiently to produce a free flowing feed product. The amount of back mixing, if required, will depend on the initial moisture content of the feed.

The devolatilized char is then metered into a pneumatic convey line 15b containing FGR gases to prevent char oxidation. Also, solid, liquid, and/or gas additives can be introduced at this point, i.e., after devolatilization and prior to activation. The char is then introduced tangentially into the activation Reaction Vessel 14a that is the same calcining Reaction Vessel described above. This vessel operates in the same manners as described above with the exception of the fact that the devolatilization reactions have already been substantially completed. The AC discharge and product handling remain the same regardless of whether a single stage or multiple devolatilization and activation process is chosen.

As previously mentioned dual stage production can also be accomplished using two separate flash calciners operating a different temperatures. One unit would produce devolatilized char and would then feed the other calciner Reaction Vessel that would activate the char to produce AC. Though considerably less efficient, this method could allow each stage to have separate emissions control equipment and differing process rates.

Process Gas Treatment 16a-16j

The flue treatment generally involves the destruction and/or removal of regulated emissions as well as utilization or control of waste heat. While there are many ways to control and treat the flue gases, the inventive process typically uses the following control techniques. A thermal oxidizer (T.O.) vessel 16a is employed to complete combustion reactions such as $H_2$, CO, and Volatile Organic Compound (VOC's) created during the AC production process as well as control NOx through the use of selective non-catalytic reduction (SNCR) technologies. This step can also be performed after dust collection with the use of externally heated thermal oxidizer or by employing the use of catalytic oxidation equipment. Typically, a T.O. positioned immediately following the AC production vessels is used. This location utilizes the high gas exit temperatures, in conjunction with a supplemental burner if required, to effectively oxidize the process gases with the addition of air 16b at proper oxidation temperatures. This minimizes the need for external heat and is therefore more efficient.

After process gases have been thermally oxidized they are cooled using a waste heat recovery boiler, a air to gas heat exchanger, or a direct spray cooler 16c depending on the site-specific requirements. The cooling medium 16d can be either air or water and is either vented or utilized in some manner such as a waste heat boiler. In the case of cooling by heat exchange with air a portion of the heated air 16e is utilized as preheated combustion air for the burner 14b.

In most cases depending on the feed material, site permit, and emissions limitation $SO_2$ abatement equipment 16f may be required. There are several viable options available such as lime base 16g or NaOH based $SO_2$ scrubbing systems. For the most stringent $SO_2$ removal requirements a spray dryer lime based scrubber is very effective and produces a dry waste stream. $SO_2$ removal efficiencies of over 90% are routinely achieved.

Dry particulate collectors otherwise known as dust collectors 16h or baghouses are used to remove remaining particulate matter. These systems are widely employed and have a proven reliability. Gas temperatures remain above the wet bulb temperature of the gas steam. The cloths to air ratios are generally in the range of 4 to 1 or less for long bag filter life. After the gases are filtered a portion of the gases are recirculated either to for material conveying or for burner flame temperature control. Ash 16i collected from the dust collector contain fly ash and in the case of lime based scrubbing the ash contains significant amounts of $CaSO3/CaSO4$ and un-reacted $Ca(OH)2$.

After the dust collector the gases are drown through a system draft fan and are sent to the stack 16j. The height of the stack and diameter are functions of gas volumes and site requirements. All stacks include test ports and platforms with associated equipment.

Activated Carbon Product Cooling 17

AC production from the Reaction Vessel 14a is extremely hot and will readily combust or oxidize upon exposure to ambient air. To avoid this, the AC is cooled either indirectly 17a or by direct moisture injection quench 17b. Preferred AC cooling utilizes indirect cooling, where the hot AC is cooled by pneumatic conveying 17c (as further described below) during pneumatic transport to product storage 19. In other words, the hot AC is not quenched to achieve cooling. To ensure that the product quality remains high the inventor favors the production of predominately granulated AC. This ensures that a minimal amount of surface area is inadvertently exposed to adverse conditions. Granular AC can be further processed and ground into pulverized AC if desired.

After cooling the AC it is either mechanically or pneumatically conveyed via means 17c to storage 19. Mechanical conveying includes screw conveyors, bucket elevators, etc.

Pneumatic conveying can be accomplished with ambient air, dried air, or other gases. Since contact between hot AC and gases can alter the AC characteristic and quality, care must be taken to avoid accidental loss of quality.

Activated Carbon Product Post Process Surface Treatment 18

A means has been developed whereby hot AC can have its characteristics dramatically altered by using a hot AC direct quench with a pneumatic conveying gas 18 or air stream. This rapid quench changes the surface characteristics of the AC in various ways depending on the gas type, temperature, and retention time. This method is readily controllable and can by useful in producing AC with specific adsorption capabilities. Quenching hot AC with air, oxygen, nitrogen, water, argon, etc. can be utilized to change the surface characteristics of the AC. The pneumatic conveying gas or air blower 18a is normally a PD type blower and can be used with inert or reactive gases. The constant volume of a PD blower is helpful in maintaining process consistency and reproducibility.

Activated Carbon Product Storage 19

The conveyed activated carbon is stored in silos 19. These material silos can be used as final product silos or as intermediate storage. The recommended silos are mass flow type that refers to a type of silo where the first product entering the silo is the first product out thus ensuring that the inventory is constantly replenished.

Activated Carbon Product Size Specification Tailoring 20

After storing the AC in the storage silos, the AC can be further refined or treated 20. Such refining or treatment can include sizing, grinding, and chemical treatments. The final product AC can be sold in bulk or packaged as required.

Furthermore, a secondary activation 21 may take place with or without newly introduced moisture or other additives, such a lignin or lignin compound. Such binders can improve granularity and other characteristics of AC.

Naturally occurring moisture levels for coal means the total internal and external water content of a given coal as it exists in the earth. Typical lignitic and subbituminous coals are received from the mine containing from about 15% to about 37% internal moisture and such coals usually lose significant moister upon exposure to ambient conditions due to mining, shipping, and sizing activities. It has been discovered that restoration of the naturally occurring moisture level (and not simply applying moisture to the exterior during processing) can improve activation of particulate coal. Of course, even coal from the same mine or area can have some variability in naturally occurring moisture levels. Thus, for a given load or sample of coal, the naturally occurring moisture level can be a value starting at the lower end of a range of values. For example, if a subbituminous coal from a mine has a naturally occurring moisture level of 20%-25%, at least 20% moisture content would be loaded into the coal prior to heat-induced activation. If there is high variability in moisture content, an average moisture content value may be used to determine the threshold amount of moisture to be loaded into the coal.

Figure 5:
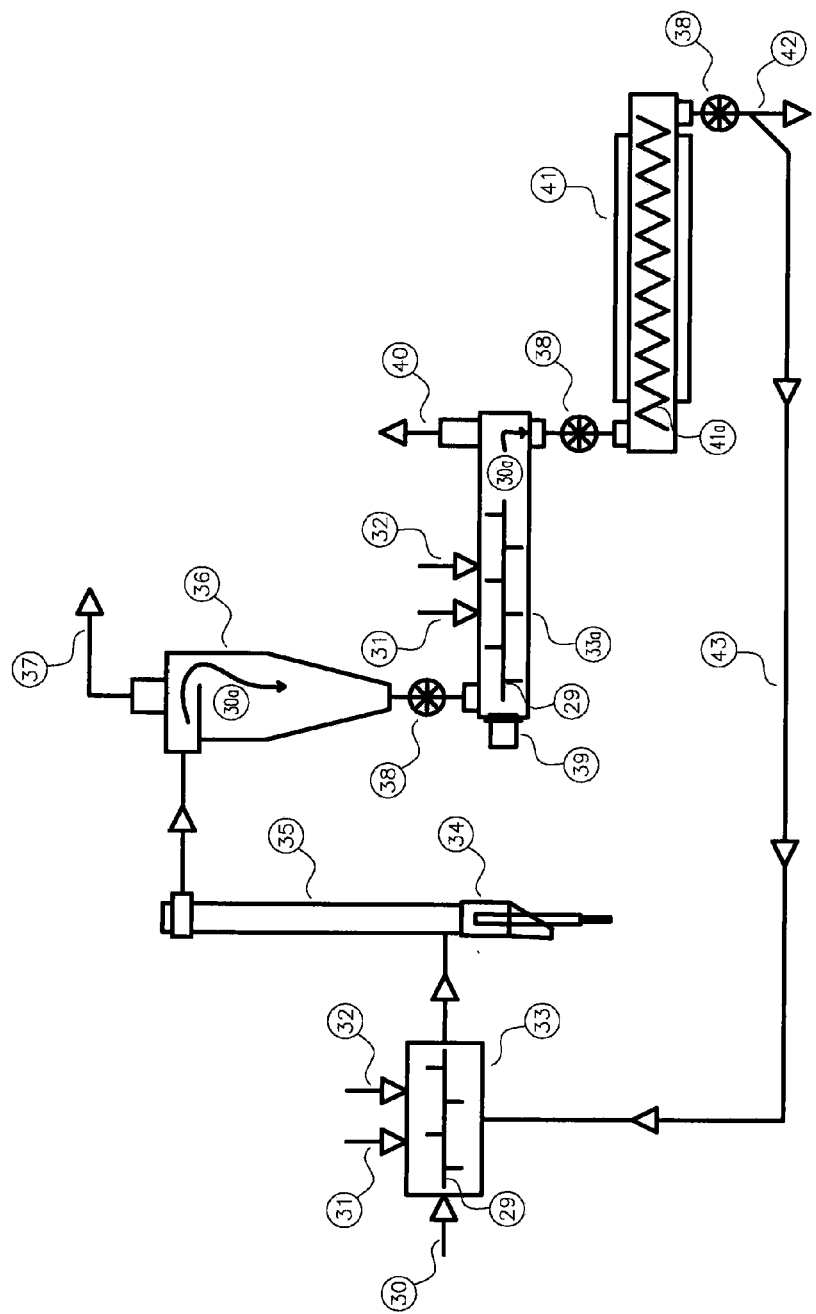
FIG. 5 schematically depicts a first system embodiment of the invention.
Figure 6:
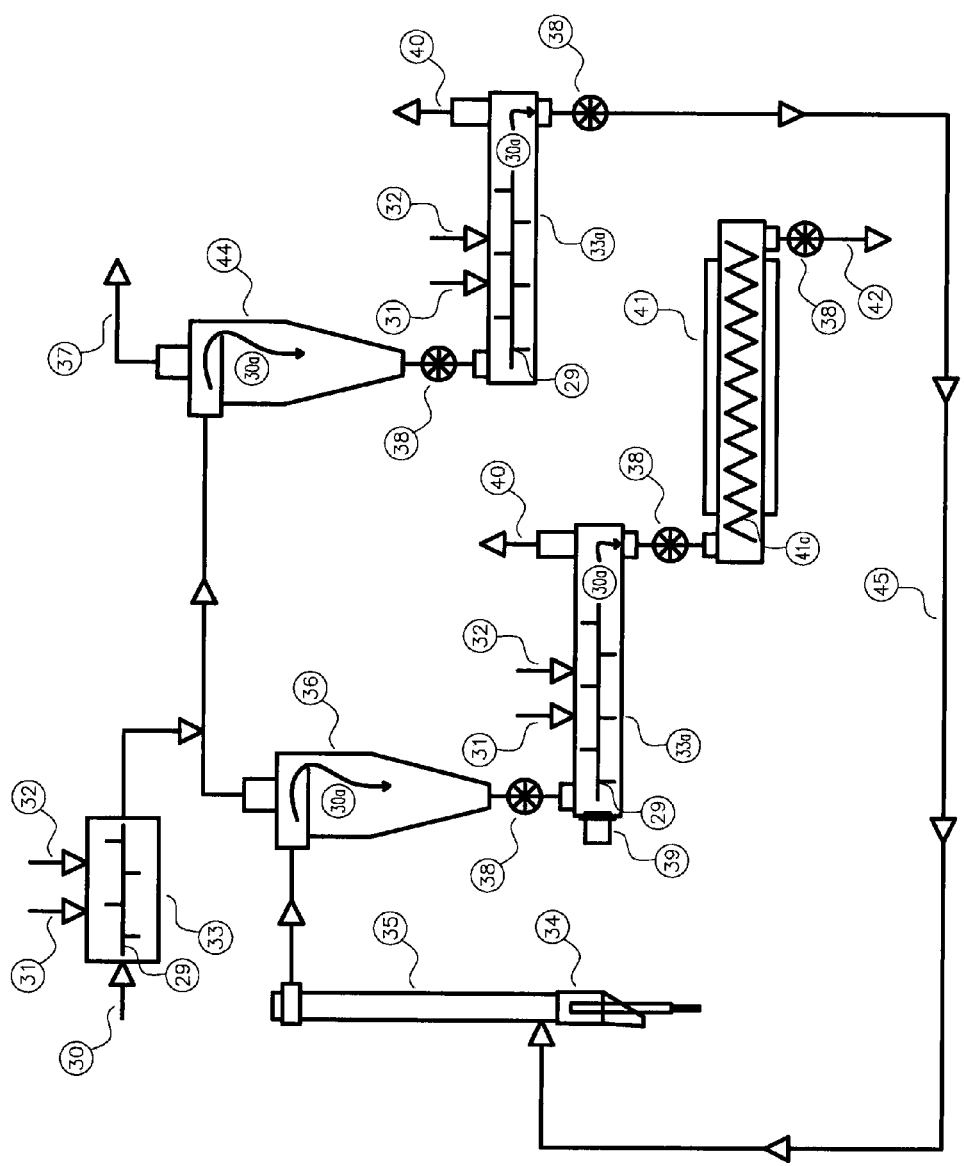
FIG. 6 schematically depicts a second system embodiment of the invention.
Figure 7:
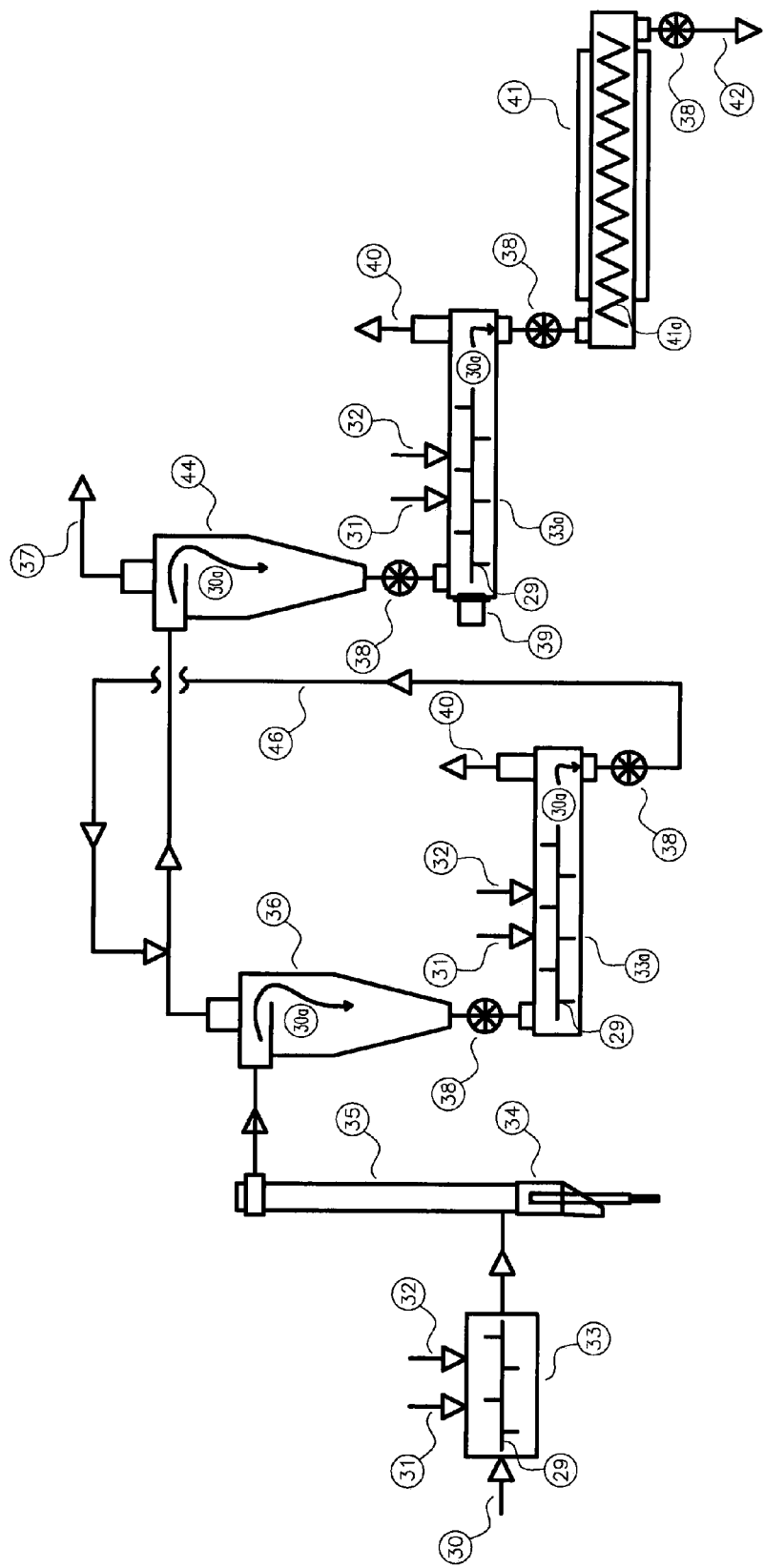
FIG. 7 schematically depicts a third system embodiment of the invention.

As illustrated in FIGS. 5-7, wherein like numerals indicate like elements, both methods and systems that enrich particulate coal with moisture up to and exceeding naturally occurring levels have been found to be advantageous. In FIG. 5, system and method for producing activated carbon from a particulate coal are depicted and herein described. Sized particulate coal 30 is loaded in to mixer 33 having mixing element 29. Within mixer 33, coal 30 is treated with an activation medium such as water through inlet 31. Optionally, a binder, co-product (e.g., lime), or other additive may also be introduced through inlet 32. The particulate coal feedstock 33 is loaded with an activation medium such that the water content of the feedstock is equal to or greater than that of the coal feedstock's naturally occurring state.

The moisture loading occurs at different rates depending on the particulate sizing. In general, the activation medium is provided and the particulate coal mixed for at least 30 seconds to ensure internal moisture content has increased to the desired level. Thus, for a typical lignite coal, this would equal roughly 30% to 37% moisture or greater (preferably, moisture does not exceed the point at which the coal is no longer flowable when pneumatically conveyed). The coal feedstock 30 is then conveyed to a heating system having a heat source (e.g., burner 34), heating chamber 35, and cyclone 36. The feedstock 30 is at least partially activated in heating chamber 35 and cyclone 36, where it is introduced tangentially and flows down to a mixing reactor 33a. Optionally, an air lock 38 can be utilized to isolate the mixing reactor 33a from cyclone 36. This isolation allows for the mixing reactor 33a to operate under different pressures and gaseous environments than that existing in cyclone 36. Gas 37 may be exhausted from cyclone 36.

As mentioned above, the heat treatment system may include a mixing reactor 33a within which the heat-treated carbon 30a formed from the particulate coal feedstock 30 may again be mixed with an activation medium and/or other additive through inlets 31 and 32. An optional auxiliary burner 39 can be utilized with the mixing reactor to add additional heat, which, in turn, permits further use of an activation medium, enhancer or other additive and additional activation of the heat-treated carbon 30a. An exhaust vent 40 is present in the mixing reactor to allow for required ventilation.

The heat-treated carbon 30a next can be conveyed to an indirect cooler 41 having a mechanical conveyer, such as screw 41a. An indirect cooler is one in which the coolant does not directly contact the heat-treated carbon, thereby controlling further reactions. The mechanical conveyer is advantageous because of the high heat transfer accomplished by the conveyer's surfaces. From the indirect cooler 41, the AC product 42 can be dispensed and/or at least a portion can be re-circulated back through the heating system as indicated by arrow 43. Recirculation of AC product can increase the overall AC product surface area since the re-circulated portion experiences additional activation.

FIGS. 6 and 7 depict alternate configurations and methods in which particulate coal feedstock 30 is at least partially activated (thereby forming a heat-treated carbon 30a and eventually culminating in AC product 42) and then re-circulated through the heat treatment system (arrow 45 in FIG. 6 and arrow 46 in FIG. 7). As is further depicted in FIGS. 6 and 7, multiple stages of heating and activation medium, co-product, and/or enhancer treatment can occur. In one preferred embodiment, an enhancer is provided to the heat-treated carbon 30a (FIG. 7, through inlet 32). For example, hydrobromous acid may be added, thereby providing a unique path to bromination of a co-product such a lime.

According to the foregoing, the invention has distinguishing features from other methods. Along with a higher AC yield and the ability to process feedstock into a variety of treated carbons using the same heat-treatment system, process temperature can controlled using threshold amounts of coal and heat-treated carbon moisture. This allows the conveying gas flows to remain stable without the need to fluctuate other parameters such as combustion air, flue gas recirculation, and primary heat source fuel to adjust and maintain temperature.

Various modifications are possible within the meaning and range of equivalence of the appended claims.

What is claimed is:

1. A method for flash-activation of a particulate lignitic or subbituminous coal suitable for forming activated carbon, comprising the steps of:
   a. loading a particulate lignitic or subbituminous coal feedstock with an activation medium such that the water content of said particulate lignitic or subbituminous coal feedstock is equal to or greater than that of said coal feedstock's naturally occurring state of about 15% to about 37% internal moisture;
   b. conveying the particulate lignitic or subbituminous coal feedstock of step (a) into a heat treatment system; and
   c. flash heat treating said particulate lignitic or subbituminous coal feedstock of step (b) such that at least partial activation occurs.

2. The method of claim 1, wherein said particulate coal feedstock undergoes at least one additional heat treatment after said at least partial activation occurs.

3. The method of claim 1, wherein said particulate coal feedstock undergoes devolatilization and at least partial activation in one reactor or reaction vessel.

4. The method of claim 1, where said particulate coal feedstock is at least partially heated by a waste gas from said heat treatment system.

5. The method of claim 1, wherein the particulate coal feedstock of step (a) is flowable in a conveying gas.

6. The method of claim 1, further comprising the step of providing a secondary activation of a heat-treated carbon formed by the particulate coal feedstock in step (c).

7. The method of claim 6, further comprising the step of providing a binder co-currently with said heat-treated carbon during said secondary activation.

8. The method of claim 7, wherein said binder is lignin or lignin compound.

9. The method of claim 6, wherein said activation medium is disposed upon the heat-treated carbon prior to or co-currently with said secondary activation step.

10. The method of claim 1, wherein a heat-treated carbon formed by the particulate coal feedstock in step (c) is physically conveyed within an indirect cooler.

11. The method of claim 1, wherein said particulate coal feedstock is loaded with said activation medium for at least 30 seconds prior to activation.

12. The method of claim 1, further comprising the step of providing a co-product industrial mineral co-currently with said particulate coal feedstock prior to activation in step c.

13. The method of claim 1, further comprising the step of providing an enhancer co-currently with said particulate coal feedstock prior to activation in step c.

14. The method of claim 1, further comprising the step of providing an additive to the heat-treated carbon formed by the particulate coal feedstock after activation in step c.

15. The method of claim 1, further comprising the step of re-circulating at least a portion of a heat-treated carbon formed by the particulate coal feedstock in step (c) through an additional heat treatment in said heating system.

16. A method for flash-heating production of activated carbon from a particulate lignitic or subbituminous coal suitable for forming same, comprising the steps of:
   a. mixing a particulate lignitic or subbituminous coal feedstock with an activation medium in a mixer such that the water content of said particulate lignitic or subbituminous coal feedstock is equal to or greater than that of said lignitic or subbituminous coal feedstock's naturally occurring state of about 15% to about 37% internal moisture;
   b. pneumatically conveying the particulate lignitic or subbituminous coal feedstock with said water content from the mixer into a heat treatment system; and
   c. flash heat treating said particulate lignitic or subbituminous coal feedstock of step (b) such that at least partial activation occurs.

17. The method of claim 16, wherein a heat-treated carbon formed by said particulate coal feedstock undergoes at least one additional heat treatment after said at least partial activation occurs.

18. The method of claim 16, wherein said particulate coal feedstock undergoes devolatilization and at least partial activation in one reactor or reaction vessel.

19. The method of claim 16, where said particulate coal feedstock is at least partially heated by a waste gas from said heat treatment system.

20. The method of claim 16, further comprising the step of providing a secondary activation of a heat-treated carbon formed by the particulate coal feedstock in step (c).

21. The method of claim 20, further comprising the step of providing a binder concurrently with said heat-treated carbon during said secondary activation.

22. The method of claim 21, wherein said binder is lignin or lignin compound.

23. The method of claim 20, wherein said activation medium is disposed upon the heat-treated carbon prior to or co-currently with said secondary activation step.

24. The method of claim 16, wherein a heat-treated carbon formed by the particulate coal feedstock in step (c) is physically conveyed within an indirect cooler.

25. The method of claim 16, wherein said particulate coal feedstock is loaded with said activation medium for at least 30 seconds prior to activation.

26. The method of claim 16, further comprising the step of providing a co-product industrial mineral co-currently with said particulate coal feedstock prior to activation in step c.

27. The method of claim 16, further comprising the step of providing an enhancer co-currently with said particulate coal feedstock prior to activation in step c.

28. The method of claim 16, further comprising the step of providing an additive to a heat-treated carbon formed by the particulate coal feedstock after activation in step c.

29. The method of claim 16, further comprising the step of re-circulating at least a portion of a heat-treated carbon formed by the particulate coal feedstock that has undergone said at least partial activation through an additional heat treatment in said heating system.

* * * * *